United States Patent [19]

Kelyman et al.

[11] 4,152,342
[45] May 1, 1979

[54] OLEOPHILIC AMIDOPOLYETHYLENEPOLYAMINES

[75] Inventors: Jacqueline S. Kelyman; George A. Paul, both of Midland, Mich.

[73] Assignee: The Dow Chemical Company, Midland, Mich.

[21] Appl. No.: 786,731

[22] Filed: Apr. 11, 1977

Related U.S. Application Data

[63] Continuation of Ser. No. 597,791, Jul. 21, 1975, abandoned.

[51] Int. Cl.$^2$ .............................................. C09F 5/00
[52] U.S. Cl. ................... 260/404.5; 252/47.5; 252/51.5 A; 260/556 A; 260/561 R
[58] Field of Search ......................... 252/51.5 A, 47.5; 260/404.5, 561 R, 556 A

[56] References Cited

U.S. PATENT DOCUMENTS

| | | | |
|---|---|---|---|
| 2,291,396 | 7/1942 | Lieber | 252/51.5 A X |
| 3,169,980 | 2/1965 | Benoit | 252/51.5 A X |
| 3,298,955 | 1/1967 | Strang | 252/51.5 A |
| 3,347,789 | 10/1967 | Dickson et al. | 260/429 R X |
| 3,444,170 | 5/1969 | Norman et al. | 252/51.5 A X |
| 3,448,048 | 6/1969 | Le Suer et al. | 252/51.5 A |
| 3,857,791 | 12/1974 | Marcellis et al. | 252/51.5 A |

Primary Examiner—Delbert E. Gantz
Assistant Examiner—Andrew Metz
Attorney, Agent, or Firm—L. Wayne White; J. P. Hill

[57] ABSTRACT

Novel polyamines are disclosed which consist essentially of linear chains of the formula

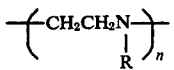

wherein R is H or the acyl group of a fatty acid or an alkylsulfonic acid and n is a number about 6-22. Of the n units in the chain, in about 0 to 50% R is an acyl group of about 20-150 carbon atoms, in about 5-75% R is an acyl group of about 1-18 carbon atoms and in about 10-90% R is H.

The compounds are made by appropriate partial acylation of the corresponding polyethylenepolyamine or by (a) polymerizing a 2-alkyl-2-oxazoline and then partially hydrolyzing and reacylating the polymer thus obtained. They are useful as surfactants, especially as detergents in lubricating oils.

1 Claim, No Drawings

OLEOPHILIC AMIDOPOLYETHYLENEPOLYAMINES

CROSS-REFERENCE TO RELATED APPLICATION

This is a continuation of application Ser. No. 597,791 filed July 21, 1975 and now abandoned.

BACKGROUND OF THE INVENTION

A great variety of acylated polyalkylenepolyamines is known. The following are believed to be the most relevant references known to the present inventors.

Strang, U.S. Pat. No. 3,298,955, Class 252-51.5, discloses acylated polyamines of the formula

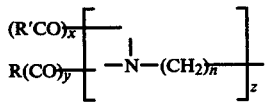

wherein R is an olefinic polymer chain of 40–700 carbon atoms, R' is an alkyl radical of 1–8 carbon atoms, n is 1–8, x is at least 2, y is 0 or 1 and z is at least 3 and preferably is 3–8. The amines used to make these products were the usual polyalkylenepolyamines such as triethylenetetramine, tetraethylenepentamine, pentaethylenehexamine and the corresponding propylene and butyleneamines. These are known to be highly branched in structure and of very limited range in chain length (z is 3–8). The compounds are said to be useful as lubricating oil detergents.

Norman and LeSeur, U.S. Pat. No. 3,444,170, Class 260-268, disclose acylated amines similar to Strang's except that the acyl groups are all of the same size. Preferred polyalkyleneamine for use in their invention is tetraethylene-pentamine.

Dickson and Jenkins, U.S. Pat. No. 3,347,789, Class 252-8.55, disclose amides made by acylating polyalkylenimines of molecular weight at least 800 with acyl groups of 6–40, and preferably 8–30, carbon atoms. Among other uses they are said to be useful as lubricating oil additives.

SUMMARY OF THE INVENTION

The invention relates to linear polymers consisting essentially of chains of the formula

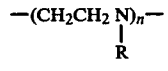

wherein n is a number about 8–22 and each R independently is H or the acyl group of a fatty acid or an alkylsulfonic acid, about 10–95% of the R groups being H, about 0–50% being acyl groups of about 20–150 carbon atoms and about 5–90% being acyl groups of 1–18 carbon atoms.

Other aspects of the invention are in methods for making the above polymers and in lubricating oils comprising such polymers.

DETAILED DESCRIPTION OF THE INVENTION

The polymers of the invention are conveniently made from linear poly-2-oxazolines wherein the 2-position bears an alkyl substituent of 1–17 carbon atoms and the degree of polymerization is about 8–22. Such polymers are known and are readily made by the cationically catalyzed ring-opening polymerization of the oxazoline. Such polymers are acylated polyethylenimines or, as they are sometimes called, polyethyleneamines.

A convenient procedure for making the poly-2-oxazolines comprises heating the monomer with a strong acid ion exchange resin, such as one having free sulfonic acid groups. The resin itself or small amounts of moisture therein acts as the initiator (telogen). The polymer can be washed from the ion exchange resin with water. The molecular weight of the polymer can be controlled within wide limits by varying the ratio of initiator to monomer, the molecular weight varying inversely with the proportion of initiator.

The acylated polyethylenimines are partially hydrolyzed to remove the desired proportion of acyl groups and replace them with hydrogen. It was known heretofore to completely hydrolyze such a polymer but apparently was not known or appreciated that the reaction could be monitored and stopped at a desired point to produce a partially hydrolyzed product having unique properties and uses. For the purposes of the present invention, about 10–95%, and preferably about 15–60%, of the acyl groups should be removed. This is conveniently done by heating the acylated polyethylenimine with aqueous acid or alkali. The alkali is suitably NaOH, KOH, $Na_2CO_3$, or the like, and its concentration is suitably about 5–25% by weight, based on the aqueous alkali solution. The proportion of alkali to polyethylenimine is not critical so long as at least one equivalent of alkali is provided for each acyl group to be removed from the polymer. Acid catalysts can be used similarly, HCl and $H_2SO_4$ being suitable and convenient in concentrations of about 5–20%, based on the water used. The reaction is suitably conducted at an elevated temperature, such as 50°–100° C., and for a time sufficient to effect the desired degree of reaction. The reaction can be monitored by consumption of alkali or other convenient means and the reaction is stopped at the desired point by neutralization of the alkali, cooling of the reaction mixture, or other suitable means.

In the final step of the process of the invention, the partially hydrolyzed polyethylenimine is acylated with a long-chain acylating agent to an extent such that about 5–50% of ethylenimine groups in the polymer bear long-chain acyl groups.

The acyl group of the acylating agent has the formula

or

wherein R is an acyclic hydrocarbon radical of about 19–150 carbon atoms, preferably alkyl, and X is OH, Cl, $OCH_3$ or other readily replaceable group. The preferred acylating agents are those of the formula RCOX in which R is an alkyl group of about 15–125 carbon atoms and X is OH. Such compounds are readily available as carboxy-terminated polyolefins, such as polybutenes, polybutadienes, polypropylenes, and the like. Such compounds are also produced by the oxidation of paraffin oils and waxes. Residual unsaturation in these materials can be removed by hydrogenation if desired.

The acylation reaction is suitably conducted by heating the partially hydrolyzed polyethylenimine with the acylating agent, optionally in an inert solvent, such as toluene. If the acylating agent is an acyl halide the reaction mixture should include an acid acceptor, such as a tertiary amine, alkali metal carbonate, or the like. If it is a lower alkyl ester, such as the methyl ester, the reaction mixture should include an acid catalyst, such as HCl, $H_2SO_4$, toluene-sulfonic acid, or the like. Provision should be made for removing the byproduct water or alkanol (methanol) as it is formed during the reaction. The reaction can be monitored by measuring the amount of such byproduct that is produced and thus can be stopped when the desired degree of esterification has been accomplished.

The efficacy of the compounds of the invention as detergents or sludge dispersants in lubricating oils was estimated by a well known sludge dispersancy test.

The practice of the invention is illustrated by the following examples.

A. Preparation of N-Propionyl Polyethylenimines

2-Ethyl-2-oxazoline was polymerized by heating a mixture of 23 g of dried strong acid ion exchange resin (Dowex 50-X20) and 200 g of 2-ethyl-2-oxazoline for 4 hr. at 126° C. It was then cooled and diluted with 600 ml of water, after which the ion exchange resin was removed by filtration. The water was removed from the filtrate in a rotary vacuum evaporator and the product was further dried in a vacuum oven at 115° C. The molecular weight of the product was 750 as determined by Micro-Gel Permeation Chromatography using a ⅜ inch by 15 ft. column packed with Waters Micro-Styrogel resin of mixed pore size and a Waters Differential Refractometer, the standard being polystyrene of known molecular weight.

B. Partial Hydrolysis of the Polyethylenimines

The polymers prepared in (A) hydrolyzed by refluxing with aqueous NaOH or HCl as follows:

(1) BASE HYDROLYSIS

A solution of 25 g (0.25 mer) of poly(N-propionyl)ethylenimine in 300 ml of water and a solution of 40 g of sodium hydroxide in 100 ml of water were combined and heated under reflux for 3 hours. The water was removed by evaporation and the residual material was taken up in 200 ml of methylene chloride. The insoluble salts were removed by filtration. Removal of the methylene chloride left a residual solid. By NMR analysis, 10% of the propionyl groups had been removed by hydrolysis. The percent hydrolysis can be controlled by the length of heating period.

(2) HYDROLYSIS BY ACID

To a solution of 180 g of poly-N-propionyl ethyleneimine (having a molecular weight of 750) in 445 g of water was added 95 g of 38% aqueous HCl. This mixture was allowed to reflux at 100° C. for about 15 minutes. The solution was cooled in an ice bath, then neutralized with 1.5 kg of Dowex-Strong Base Resin-OH form to a pH of about 11. The resin was filtered and washed with water. The water was distilled off the filtrate to obtain 149 g of product. Nuclear magnetic resonance showed 30% hydrolysis of the polymer.

C. Partial Acylation of Hydrolyzed Polyethylenimines

In a typical experiment, 7 g of partially hydrolyzed polyethylenimine prepared as described above and containing 18.69 meq of —NH— groups, corresponding to 23 percent hydrolysis, and 17.29 g (9.48 meq) of a hydrogenated carboxy-terminated polybutene having an average of about 125 carbon atoms per carboxyl group were heated at 200° C. and stirred under a nitrogen atmosphere for 22 hours. After being cooled to 50° the mixture was diluted with 100 ml of hexane, filtered, and the hexane was distilled to leave the product as a waxy solid. Infrared analysis showed only residual traces of carboxyl.

D. Evaluation as Sludge Dispersant in a Petroleum-Based Motor Oil

The following laboratory test was used to screen the compounds for dispersant activity.

SPOT DISPERSANCY TEST

To a 5 dram bottle, a quantity of test additive is added to 5 grams of heavily sludged automobile crankcase petroleum-based motor oil. The bottle was then capped, heated to 300° F., and shaken for one hour to insure proper dissolution and mixing of the components. The mixture was then heated overnight in the closed container at 320° F. After the heat treatment, the bottle was removed from the oven and allowed to cool to room temperature. Six drops of oil were dropped onto the center of a 4"×5" piece of standard white blotter paper. After 24 hours, the diameter of the sludge spot and oil spot are measured. Dispersancy is reflected by the ability of the oil to keep the sludge in suspension. In this test, dispersancy is reflected by the difference in diameters of the sludge and oil spots.

SDT=(D sludge spot/D oil spot)×100

A heavily sludged oil (no test additive) will yield an SDT rating of 40 or less. An excellent dispersant will yield SDT ratings of 70 to 80 when added at 1 percent to 3 percent by weight of the active compound.

Table I summarizes the results of some typical experiments conducted essentially as described above.

In the Table, the column headed "Mers" shows the number of monomer units in the acylated polyethylenimine used to make the compound of that example as described in paragraph A above, "% Hydrolysis" refers to the hydrolysis described in paragraph B, "% Free NH Sites Reacted" refers to the partial acylation as described in paragraph C, and "Acid" describes the acid used in the partial esterification. Examples 8–10 were run identically except that in the partial esterification step Example 8 was heated 30 min. at 100° C., Example 9 was heated an additional 20 hr. at 140° C. and Example 10 was heated 30 min. at 100°, then an additional 20 hr. at 140° and finally, another 7 hr. at 190° C.

TABLE I

| Ex. No. | Mers | % Hydrolysis | % Free NH Sites Reacted | Acid | SDT % Active Additive | | |
|---|---|---|---|---|---|---|---|
| | | | | | 1 | 2 | 3 |
| 1 | 13 | 12 | 80 | $C_{100}TPB$* | 41 | 89 | 91 |
| 2 | 10 | 23 | 50 | $C_{100}TPB$ | 46 | 87 | 90 |
| 3 | 10 | 23 | 75 | $C_{100}TPB$ | 43 | 90 | 90 |
| 4 | 10 | 23 | 100 | $C_{100}TPB$ | 45 | 89 | 84 |
| 5 | 10 | 25 | 70 | $C_{50}TPB$ | 42 | 44 | 54 |
| 6 | 9 | 27 | 75 | $C_{110}TPB$ | 43 | 61 | 79 |
| 7 | 12 | 50 | 25 | $C_{110}TPB$ | 69 | 82 | 78 |
| 8 | 11 | 48 | 25 | $C_{110}TPB$ | 40 | 43 | 61 |
| 9 | 11 | 48 | 25 | $C_{110}TPB$ | 41 | 68 | 83 |
| 10 | 11 | 48 | 25 | $C_{110}TPB$ | 45 | 67 | 73 |
| 11 | 13 | 48 | 15 | $C_{100}TPB$ | 41 | 46 | 89 |
| 12 | 13 | 48 | 25 | $C_{100}TPB$ | 40 | 64 | 89 |

TABLE I-continued

| Ex. No. | Mers | % Hydrolysis | % Free NH Sites Reacted | Acid | SDT % Active Additive | | |
|---|---|---|---|---|---|---|---|
| | | | | | 1 | 2 | 3 |
| 13 | 13 | 48 | 50 | $C_{100}TPB$ | 39 | 64 | 90 |
| 14 | 13 | 48 | 75 | $C_{100}TPB$ | 41 | 48 | 56 |
| 15 | 13 | 60 | 15 | $C_{100}TPB$ | 41 | 46 | 59 |
| 16 | 13 | 60 | 25 | $C_{100}TPB$ | 38 | 44 | 56 |
| 17 | 13 | 60 | 50 | $C_{100}TPB$ | 39 | 41 | 52 |
| 18 | 13 | 60 | 50 | $C_{100}TPB$ | 39 | 44 | 51 |
| 19 | 13 | 60 | 75 | $C_{100}TPB$ | 39 | 41 | 46 |
| 20 | 10 | 12 | 80 | HCTPB | 44 | 84 | 83 |
| 21 | 10 | 23 | 75 | HCTPB | 47 | 91 | 66 |
| 22 | 10 | 23 | 50 | HCTPB | 43 | 77 | 88 |
| 23 | 11 | 48 | 25 | HCTPB | 44 | 52 | 72 |

*CTPB = Carboxy-terminated polybutene. The subscript number indicates the number of carbon atoms in the acid.
HCTPB = Hydrogenated carboxy-terminated polybutene having an average of about 125 carbon atoms per molecule.

We claim:

1. The method of making a linear polymer comprising the steps of:
    (a) polymerizing an oxazoline of the formula

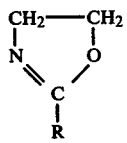

thus producing a linear N-acylated polyethylenimine whose backbone consists essentially of about 8-22 repeating units of the formula

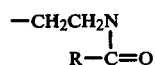

wherein R is H or alkyl of 1-17 carbon atoms;
    (b) partially hydrolyzing the N-acylated polyethylenimine, thereby to replace about 10-95 percent of the acyl groups with H; and
    (c) partially acylating the product of Step (b), using an organic acid to introduce 0-50 percent acyl groups of about 20-150 carbon atoms thus to produce the polymer.

* * * * *

UNITED STATES PATENT AND TRADEMARK OFFICE
CERTIFICATE OF CORRECTION

PATENT NO. : 4,152,342
DATED : May 1, 1979
INVENTOR(S) : Jacqueline S. Kelyman; George A. Paul It is certified that error appears in the above-identified patent and that said Letters Patent are hereby corrected as shown below:

Column 2, line 60, change "15-125" to --50-125.

Column 6, line 12, the formula should read $$\begin{array}{c}-CH_2CH_2N-\\ \phantom{-CH_2CH_2}| \\ \phantom{-CH_2CH_2}R-C=O\end{array}$$

Signed and Sealed this

Seventh Day of August 1979

[SEAL]

Attest:

LUTRELLE F. PARKER
*Attesting Officer*     *Acting Commissioner of Patents and Trademarks*